(12) United States Patent
Zimmer et al.

(10) Patent No.: US 12,492,035 B2
(45) Date of Patent: Dec. 9, 2025

(54) PHA-BASED CONTAINER AND METHOD FOR MANUFACTURING SUCH CONTAINER

(71) Applicant: SOCIETE DES PRODUITS NESTLE S.A., Vevey (CH)

(72) Inventors: Johannes Zimmer, Lausanne (CH); Michael Karlheinz Hausmann, Boudry (CH); Charlyse Pouteau, Vittel (FR); Laurent Henriquel, Epinal (FR); Karson Durie, Athens, GA (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/694,291

(22) PCT Filed: Sep. 16, 2022

(86) PCT No.: PCT/EP2022/075737
§ 371 (c)(1),
(2) Date: Mar. 21, 2024

(87) PCT Pub. No.: WO2023/046580
PCT Pub. Date: Mar. 30, 2023

(65) Prior Publication Data
US 2024/0391635 A1  Nov. 28, 2024

(30) Foreign Application Priority Data
Sep. 22, 2021 (EP) ..................................... 21198304

(51) Int. Cl.
*B65D 1/02* (2006.01)
*B65D 65/46* (2006.01)

(52) U.S. Cl.
CPC .......... *B65D 1/0207* (2013.01); *B65D 1/0246* (2013.01); *B65D 65/466* (2013.01); *B65D 2251/1041* (2013.01); *B65D 2565/381* (2013.01)

(58) Field of Classification Search
CPC .. B65D 1/0207; B65D 1/0246; B65D 65/466; B65D 2565/381; B65D 55/16; B29L 2031/7158; Y02W 90/10
(Continued)

(56) References Cited

U.S. PATENT DOCUMENTS 4,726,535 A * 2/1988 Snyder .................... B03B 9/061
                                                       29/710
5,747,633 A    5/1998 Ito et al.
(Continued)

FOREIGN PATENT DOCUMENTS

| WO | 2010065016 | 6/2010 |
| WO | 2011077821 | 6/2011 |
| WO | 2021177834 | 9/2021 |

*Primary Examiner* — Ernesto A Grano
(74) *Attorney, Agent, or Firm* — K&L Gates LLP

(57) ABSTRACT

The present invention relates to a plastic container for a liquid, comprising a body portion (1) and a neck portion (2). The body portion (1) comprises a body portion wall (3) forming a reservoir adapted to contain the liquid. The neck portion (2) is formed by a neck portion wall (6) that forms an opening (5) for filling the container with liquid and emptying the container. The container body portion wall (3) and the container neck portion wall (6) are made of biodegradable plastics at least the body portion (1) wall being made of a material comprising 40 to 99.9 weight percent of poly hydroxyalkanoate (PHA). The maximum thickness of the neck portion wall (6) is less than 2 mm, and preferably comprised between 1.2 mm and 1.6 mm. This enhances the biodegradability of the whole container.

11 Claims, 2 Drawing Sheets

(58) Field of Classification Search
  USPC .................................................... 206/524.6
  See application file for complete search history.

(56) References Cited

U.S. PATENT DOCUMENTS

| | | | | |
|---|---|---|---|---|
| 7,943,218 | B2* | 5/2011 | Knoerzer | ................ B32B 27/10 |
| | | | | 428/34.7 |
| 7,951,436 | B2* | 5/2011 | Knoerzer | ............... B82Y 30/00 |
| | | | | 428/34.7 |
| 8,133,562 | B2* | 3/2012 | Ito | ......................... C23C 16/401 |
| | | | | 427/575 |
| 9,040,120 | B2* | 5/2015 | Hunt | ................... C23C 16/0272 |
| | | | | 427/248.1 |
| 9,162,421 | B2* | 10/2015 | Mount, III | ................ B32B 7/12 |
| 9,248,947 | B2* | 2/2016 | Georgelos | ............... B32B 27/32 |
| 9,267,011 | B2* | 2/2016 | Cotton | ..................... B32B 5/18 |
| 10,710,342 | B2* | 7/2020 | Inoue | ..................... C09J 151/08 |
| 2010/0084361 | A1* | 4/2010 | Dayton | ..................... B31C 9/00 |
| | | | | 493/93 |
| 2010/0178675 | A1* | 7/2010 | Lawton, Jr. | ............... C12P 7/06 |
| | | | | 435/71.1 |
| 2011/0147335 | A1* | 6/2011 | Garcia | .................. B65D 47/12 |
| | | | | 215/230 |
| 2012/0181302 | A1 | 7/2012 | Pagan et al. | |
| 2015/0201647 | A1* | 7/2015 | Fosdick | ................... A23P 30/34 |
| | | | | 426/549 |
| 2016/0185489 | A1* | 6/2016 | Garcia | .................. B65D 47/12 |
| | | | | 215/227 |
| 2016/0362215 | A1* | 12/2016 | Patel | ....................... B32B 17/00 |
| 2020/0407100 | A1* | 12/2020 | Hsu | ......................... B65D 3/22 |
| 2021/0047095 | A1* | 2/2021 | Munoz Saiz | ........ B65D 71/502 |
| 2022/0332926 | A1* | 10/2022 | Tubbs | ..................... C08L 67/04 |

\* cited by examiner

PHA-BASED CONTAINER AND METHOD FOR MANUFACTURING SUCH CONTAINER

CROSS REFERENCE TO RELATED APPLICATIONS

The present application is a National Stage of International Application No. PCT/EP2022/075737, filed on Sep. 16, 2022, which claims priority to European Patent Application No. 21198304.4, filed on Sep. 22, 2021, the entire contents of which are being incorporated herein by reference.

FIELD OF THE INVENTION

The present invention concerns the technical field of packaging, and more particularly of beverage packaging. The present invention relates to a method for producing plastic containers, such as bottles for water or beverages.

BACKGROUND OF THE INVENTION

Many products, for example food products such as beverages or drinkable water are commonly packed into plastic containers such as bottles. The packaging industry is a major contributor to the plastic pollution issue of the oceans and shores. Plastic beverage containers greatly contribute to the visibility of this problem.

Indeed, most of the beverage bottles are made of Polyethylene terephthalate (PET). Even though recyclable, conventional PET is neither bio-sourced nor biodegradable. Consequently, PET containers that end up unintentionally in the environment will not naturally degrade (or only so in an extremely long time) and hence contribute to plastic pollution.

The bottles used to store a product such as a liquid that are commercially available are mainly manufactured by using a method called "injection stretch blow molding" which can be designated by its acronym "ISBM".

ISBM comprises injecting a thermoplastic resin into a mold to create a preform, heating the preform to a temperature below its recrystallization point and blow-molding the preform.

Polyhydroxyalkanoates (PHA) are bio-sourced and biodegradable, possibly food grade, materials that can be used as alternatives to conventional plastic materials (as PET) to produce biodegradable water bottles including the closure and label part. They comprise the Polyhydroxybutyrates (PHB), for example polyhydroxyvalerate (PHV) and polyhydroxyhexanoate (PHH).

The use of PHA can pose implementation difficulties. More particularly, ISBM is very difficult to use with PHA. To produce containers made of PHA, a known alternative to ISBM is Extrusion Blow Molding (EBM). In extrusion blow molding, a continuous parison is axially (vertically) extruded, clamped into a cavity and blown radially to form a container.

In addition, although this material is biodegradable, the time required for its degradation depends greatly on the thickness of the piece of material to be degraded.

The neck of a bottle is generally the most massive part of a bottle.

There are several types of conventional neck used to seal a bottle with a closure.

Conventional threaded necks, adapted to receive a corresponding treaded cap, generally have a height comprised between 15 and 25 mm. The walls forming such necks generally have a thickness comprised between 2 mm and 3.5 mm, measured between an inner surface of the neck and an outer surface, including the thread.

So-called "snap-on neck" solutions are also known to close and seal a plastic bottle. Such closures do not use a thread. These solutions are based on a flipping cap or closure that is adapted to snap-fit over the opening of the neck. They provide a reduction of the neck and closure height and of the neck thickness thanks to the absence of threaded part. However, the neck and the closure are still thick parts of the bottle, that will require much time to degrade.

The present invention thus aims at optimizing plastic containers, especially the bottles, to enhance their complete biodegradability.

SUMMARY OF THE INVENTION

The present invention concerns a plastic container for a liquid, comprising a body portion and a neck portion. The body portion comprises a body portion wall forming a reservoir adapted to contain the liquid, and the neck portion is formed by a neck portion wall that forms an opening for filling the container with liquid and emptying the container. The container body portion wall and the container neck portion wall are made of biodegradable plastics, at least the body portion wall being made of a material comprising 40 to 99.9 weight percent of polyhydroxyalkanoate (PHA). The maximum thickness of the neck portion wall is less than 2 mm, and preferably comprised between 1.2 mm and 1.6 mm.

The thickness of an object made of biodegradable plastics has been identified by the Applicant has a major parameter that influences the degradation time of this object. Because conventional plastic containers (e.g. the plastic bottles) are made of non-biodegradable plastic, they are not optimized for degradation. In a container according to the invention, the neck portion is optimized, in particular in that it is formed by a wall of biodegradable plastics having the lowest possible thickness providing sufficient stiffness, in particular for receiving an adapted closure. In particular, in the containers of the state of the art, the walls of the necks always have a thickness greater than 2 mm (at least in conventional, common, applications). There is no known biodegradable plastic container with a neck wall less than 2 mm thick.

Good biodegradation properties are obtained with a wall having a maximum thickness of 1.6 mm. This is why a thickness less than this value is preferred.

The neck portion wall and the body portion wall are linked in a smooth transition, without ribs and without sudden change in thickness. Such a smooth transition between the neck portion and the body portion of the container prevents the creation of massive zones, which would biodegrade poorly.

The neck portion can be substantially cylindrical and can have a diameter of more than 25 mm. A larger diameter than in conventional containers makes it possible to reduce further the thickness of the neck portion wall while providing the desired mechanical properties, and in particular the desired stiffness. The neck portion can have a height of less than 15 mm, and preferably between 10 mm and 12 mm.

The neck portion can comprise a thread and the container can comprise a threaded cap made of a biodegradable plastic material adapted to be screwed on the thread of the neck portion.

Alternatively, the plastic container can comprise a flipping cap adapted for adapted for snap-fitting onto the neck portion to close closing its opening.

Alternatively, the plastic container can comprise a closure lid sealed on the opening of the neck portion. The closure lid can be substantially made of aluminum, a biodegradable plastic material, or coated paper The height, the wall thickness, and the diameter of the neck portion are reduced to their minimum value, or close to said minimum value, depending on the closure technology used for the container considered. A height of 12 mm to 15 mm is adapted for a screw cap. When a snap-on cap is used, the height of the neck portion can be reduced to around 10 mm. When a sealed lid is used for closing the container, a height of the neck portion around 10 mm can be sufficient and the thickness of the neck portion wall can be reduced to around 1.2 mm (depending on the biodegradable plastic used for the neck portion wall).

The body portion and the neck portion can be made of different materials. The neck portion is for example made of a PHA based material that is more biodegradable than the PHA based material of which the body portion is made. For example the neck portion is made of a PHA material comprising an additive that enhances its biodegradability, for example cellulose. The neck portion can be made of cellulose-based plastics or of protein-based plastics.

The PHA of at least the body portion can be a random monomeric repeating unit having of the formula:

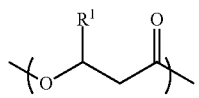

wherein $R^1$ is selected from the group consisting of CH3 and a C3 to C19 alkyl group.

The invention also relates to a method for manufacturing a plastic container in which the body portion and the neck portion is made of different materials, wherein the method comprises:
  forming a preform by bi-injection;
  heating the preform; and
  performing a stretch blow molding of the preform.

This makes it possible to provide a container with biodegradable plastics having different properties for the body portion and the neck portion, respectively. While a PHA having mechanical properties making it adapted for molding are sought for forming the body portion, high biodegradability but poorer mechanical properties can be sought for the plastic material used for the neck portion.

The method can comprise forming the container by using a compression blow molding process. Compression blow molding is a convenient process in particular for forming a thin-walled neck portion, while it is adapted for manufacturing a container from plastic material or materials, such as PHA, that are difficult to mold with other processes such as injection blow-molding.

The invention also relates to a plastic container as above described containing drinkable water or a beverage.

The present invention is particularly suitable for providing containers for the food industry. Beverage containers, such as bottles, e.g. 20cL, 33cL, 0.5cL, 1L, 1.5L, 2L can for example be provided according to the present invention. Water (flavoured or not) bottles can be produced according to the present invention.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
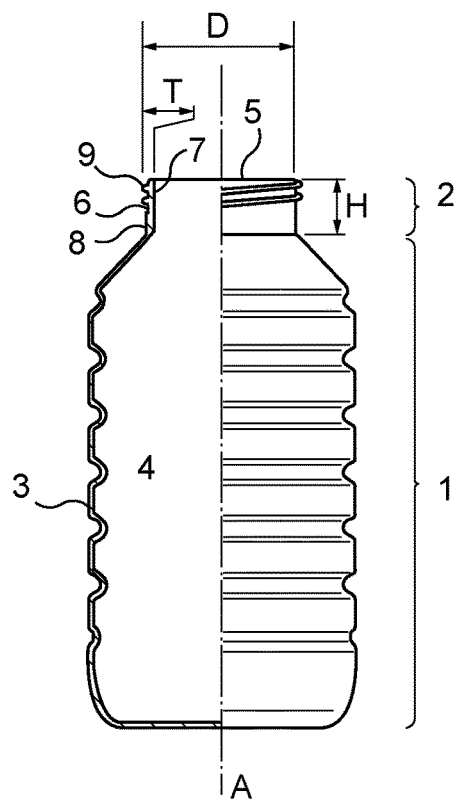
FIG. 1 schematically represents a container, namely a bottle, according to a first example embodiment of the present invention.

FIG. 1 schematically represents a container according to a first example embodiment of the invention, according to a half-sectional view. The container represented in FIG. 1 is bottle that can for example be used to contain, transport, and to sell drinkable water.

The bottle of FIG. 1 comprises, in a known way, a body portion 1 and a neck portion 2. The body portion has a body portion wall 3 that defines a reservoir having an inner volume 4 where liquid can be stored.

The neck portion 2 corresponds to the top, straight portion of the bottle that is provided with an opening 5. In the represented example embodiment, the neck portion extends in a direction parallel to the main extension axis A of the bottle, that is also a revolution axis of the bottle in this embodiment. The neck portion is intended to carry a closure that can be provided according to several alternative means, as hereafter explained.

The neck portion 2 is formed by a neck portion wall 6.

The neck portion wall 6 and the body portion wall 3 are both made of biodegradable material(s). More particularly, the body portion wall 3 (and optionally the neck portion wall 6) is made of PHA.

PHAs comprise the Polyhydroxybutyrates (PHB), for example polyhydroxyvalerate (PHV) and polyhydroxyhexanoate (PHH), and mixtures of materials among the PHAs.

PHA, and in particular some PHA grades, have interesting mechanical properties that make them suitable for being used to form thin walls with known processes such as ISBM or EBM (with adapted process parameters).

The PHA that is used should be highly biodegradable, depending on the design of the container, and can be even compostable. The containers are preferably made by modifying the PHA with melt strength enhancers, chain extenders, and other processing aids.

As used herein, "compostable" can designate a material that meets the following requirements: the material is capable of being processed in a composting facility for solid waste; if so processed, the material will end up in the final compost; and if the compost is used in the soil, the material will ultimately biodegrade in the soil according to the standard ASTM D6400 for industrial and home compostability.

In particular, the PHA used can have random monomeric repeating units having of the formula:

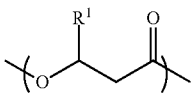

wherein $R^1$ is selected from the group consisting of CH3 and a C3 to C19 alkyl group.

The PHA used can be, for example, a neat co-polymer of polyhydroxyburate and polyhydroxyhexanoate. This co-polymer can be hydroxybutyrate-co-3-hydroxyhexanoate (P3HB-co-P3HHx).

The PHA used can thus be, for example, a neat poly (hydroxybutyrate-co-hydroxyhexanoate) (PHBHH) containing 97 mol % of polyhydroxybutyrate (PHB) and 3 mol % of polyhydroxyhexanoate PHH. Other neat PHAs can be used, such as a poly(hydroxybutyrate-co-hydroxyhexanoate) (PHBHH) containing 94 mol % of polyhydroxybutyrate (PHB) and 6 mol % of polyhydroxyhexanoate PHH, a poly(hydroxybutyrate-co-hydroxyhexanoate) (PHBHH) containing 91 mol % of polyhydroxybutyrate (PHB) and 9 mol % of polyhydroxyhexanoate PHH, or any neat poly(hydroxybutyrate-co-hydroxyhexanoate) (PHBHH) comprising between 3 mol % and 9 mol % of polyhydroxyhexanoate (PHH).

Optionally, an additive can be added to the neat PHA to form the PHA used. This additive is for example one of pentaerythritol, organic peroxide, an acrylic resin such as Joncryl®, and inositol, or a mix of two or more of these components. The PHA used can comprise between 0% (i.e. no additive) and 1% in weight of additive.

In embodiments, at least about 50 mol %, but less than 100%, of the monomeric repeating units have CH3 as $R^1$, more preferably at least about 60 mol %; more preferably at least about 70 mol %; more preferably at least about 75 to 99 mol %.

In other embodiments, a minor portion of the monomeric repeating units have $R^1$ selected from alkyl groups containing from 3 to 19 carbon atoms. Accordingly, the copolymer may contain from about 0 to about 30 mol %, preferably from about 1 to about 25 mol %, and more particularly from about 2 to about 10 mol % of monomeric repeating units containing a C3 to C19 alkyl group as $R^1$.

In some embodiments, the PHA used include from about 40 to about 99 weight percent of poly(hydroxyalkanoate) copolymer and from about 1 to about 60 wt. % additional additives.

In some embodiments, the biodegradable container includes polyhydroxybutyrate as the poly(hydroxyalkanoate).

In other embodiments, the poly(hydroxyalkanoate) copolymer includes poly-3-hydroxybutyrate-co-3-hydroxyhexanoate (P3HB-co-P3HHx).

In some embodiments, at least the body of the biodegradable container (i.e. the container except its closure) and the preform further include from about 1.0 to about 15.0 weight percent of at least one poly(hydroxyalkanoate) comprising from about 25 to about 50 mole percent of a poly(hydroxyalkanoate) selected from the group consisting of poly(hydroxyhexanoate), poly(hydroxyoctanoate), poly(hydroxydecanoate), and mixtures thereof.

In some embodiments, at least the body of the biodegradable container and the preform further include poly(hydroxyalkanoate) s that include a terpolymer made up from about 75 to about 99.9 mole percent monomer residues of 3-hydroxybutyrate, from about 0.1 to about 25 mole percent monomer residues of 3-hydroxyhexanoate, and from about 0.1 to about 25 mole percent monomer residues of a third 3-hydoxyalkanoate selected from the group consisting of poly(hydroxyhexanoate), poly(hydroxyoctanoate), poly(hydroxydecanoate), and mixtures thereof.

In some embodiments the polymer of the biodegradable container and the preform has a weight average molecular weight ranging from about 50 thousand Daltons to about 2.5 million Daltons.

In other embodiments, the polymer of the biodegradable container and the preform further includes from about 0.1 weight percent to about 10 weight percent of at least one nucleating agent selected from erythritols, pentaerythritols, dipentaerythritols, artificial sweeteners, stearates, sorbitols, mannitols, inositols, polyester waxes, nanoclays, polyhydroxybutyrate, and mixtures thereof.

In some embodiments, the biodegradable container and the preform further include from about 0.05 weight percent to about 1 weight percent at least one melt strength enhancer chosen from the group consisting of a multifunctional epoxide; an epoxy-functional, styrene-acrylic polymer; an organic peroxide; and a mixture thereof.

In some embodiments the biodegradable container and the preform further include from about 1 weight percent to about 60 weight percent of polymers selected from the group consisting of poly(lactic acid), poly(caprolactone), poly(ethylene sebicate), poly(butylene succinate), and poly(butylene succinate-co-adipate), and copolymers and blends thereof.

In some embodiments, the polymer and the preform further include from about 0.1 weight percent to about 5 weight percent of a reheat agent selected from carbon black, infrared absorbing pigments, and mixtures thereof.

In other embodiments, the polymer and preform further include from about 0.1 weight percent la about 10 weight percent of a tiller selected from calcium carbonate, talc, starch, and the like.

In some embodiments, the biodegradable container and preform further include from about 0.1 weight percent to about 5 weight percent polymeric fibers for structural support, such as stereocomplex poly(lactic acid) (PLA) fibers.

In some embodiments, the biodegradable container and preform further comprise from about 0.1 weight percent to about 3 weight percent of a fatty acid amide slip agent.

In other embodiments, the biodegradable container and preform further comprises up to about 15 weight percent of a plasticizer selected from sebacates; citrates; fatty esters of adipic acid, succinic acid, and glucaric acid; lactates; alkyl diesters; alkyl methyl esters; dibenzoates; propylene carbonate; caprolactone diols having a number average molecular weight from about 200 to about 10,000 g/mol; poly(ethylene) glycols having a number average molecular weight of about 400 to about 10,000 g/mol; esters of vegetable oils; long chain alkyl acids; adipates; glycerols; isosorbide derivatives or mixtures thereof; polyhydroxyalkanoate copolymers comprising at least 18 mole percent monomer residues of hydroxyalkanoates other than hydroxybutyrate; and mixtures thereof.

Exemplary formulations that may be used to make biodegradable containers according to the disclosure are shown in the following table.

| Formula | PHA polymer wt % 3 mol % Hexanoate in polymer | PHA polymer wt % 6 mol % Hexanonte in polymer | PHA polymer wt % 9 mol % Hexanoate in polymer | Weight % Polylactic acid | Weight % Pentaerythritol | Weight % Organic peroxide | Weight % Joncryl | Weight % Inositol | Weight % Polylactic acid fibers |
|---|---|---|---|---|---|---|---|---|---|
| 1  | 59.34 | —     | —    | 39.56 | 1 | 0.1 | —   | — | — |
| 2  | 69.23 | —     | —    | 29.67 | 1 | 0.1 | —   | — | — |
| 3  | 79.12 | —     | —    | 19.78 | 1 | 0.1 | —   | — | — |
| 4  | 99    | —     | —    | —     | 1 | —   | —   | — | — |
| 5  | 94    | —     | —    | 5     | 1 | —   | —   | — | — |
| 6  | 98.9  | —     | —    | —     | 1 | 0.1 | —   | — | — |
| 7  | 65.87 | 32.93 | —    | —     | 1 | 0.2 | —   | — | — |
| 8  | 98.8  | —     | —    | —     | 1 | —   | 0.2 | — | — |
| 9  | 24.7  | 74.1  | —    | —     | 1 | —   | 0.2 | — | — |
| 10 | 49.4  | 49.4  | —    | —     | 1 | —   | 0.2 | — | — |
| 11 | 74.1  | 24.7  | —    | —     | 1 | —   | 0.2 | — | — |
| 12 | 93.8  | —     | —    | —     | 1 | —   | 0.2 | — | 5 |
| 13 | 49.4  | —     | 49.4 | —     | 1 | —   | 0.2 | — | — |
| 14 | 74.1  | —     | 24.7 | —     | 1 | —   | 0.2 | — | — |
| 15 | 98.2  | —     | —    | —     | 1 | —   | 0.8 | — | — |
| 16 | 97.8  | —     | —    | —     | — | —   | 0.2 | 2 | — |

The neck portion wall 6 has thickness T that is substantially reduced compared to common analogous containers. The thickness T of the neck portion wall 6 is measured between an inner surface 7 of the neck portion wall 6 and an outer surface 8 of the neck portion wall 6. The thickness T of the neck portion wall 6 can be substantially constant along the neck portion wall 6. The thickness T of the neck portion wall 6 is less than 2 mm (including the thread 9 that can be provided on the outer surface 8 in some embodiments of the container). It is preferably comprised between 1.2 mm and 1.6 mm. In some embodiments, the neck portion wall 6 can be even thinner, e.g. around 1 mm.

The neck portion wall 6 is formed as an extension of the body portion wall 3. They are formed as one piece (although the neck portion 1 and the body portion 2 can be made of different materials as hereafter explained). There is preferably no extra thickness where the neck portion 2 and the body portion 1 are joined. No rib and no sudden change in thickness is provided between the neck portion 2 and the body portion 1.

According to general provisions, a container according to the present invention has preferably a short neck portion, i.e. a neck portion having a low height H, measured in the direction of extension of the neck portion (that is to say along a direction parallel to axis A in the present embodiment). The height of the neck portion is preferably comprised between 10 mm and 15 mm, preferably between 10 mm and 12 mm.

When the neck portion has a circular cross-section, which is generally the case, it has a large diameter D, preferably larger than 25 mm.

In the embodiment represented in FIG. 1, the neck portion is provided with a thread 9. A corresponding threaded cap can be used as closure for the container. The cap (not shown in FIG. 2) is advantageously made of a biodegradable plastic material, such a PHA.

In such an embodiment comprising a threaded neck portion, a 12 mm height of the neck portion appears to be a good compromise to provide a reliable and tight closure with a small neck portion 2.

Figure 2:
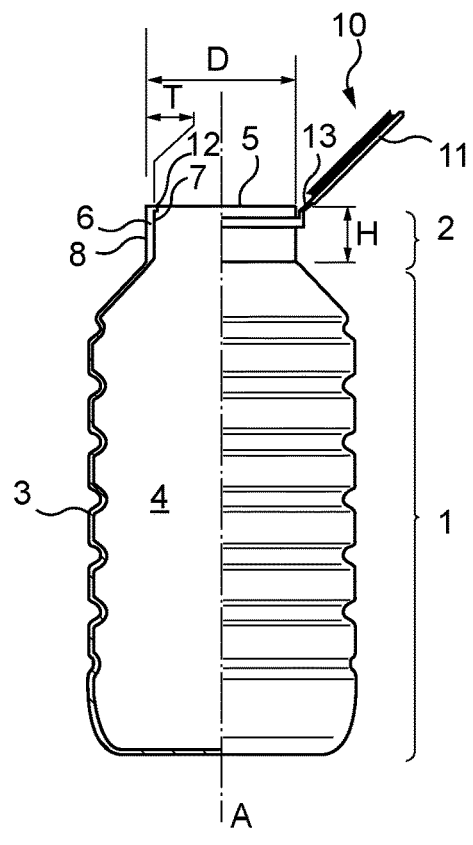
FIG. 2 represents a bottle according to a second example embodiment of the invention.

FIG. 2 represents a bottle according to a second example embodiment of the invention. In this embodiment, the body portion is similar to the body portion of the container of FIG. 1. More generally, the bottle of FIG. 2 corresponds to the bottle of FIG. 1 except for the neck portion 2 and its closure means. One can therefore refer to the description of FIG. 1, except for the features described below.

The neck portion of the container of FIG. 2 is equipped with a snap-on closure 10. The snap-on closure represented in FIG. 2 comprises a cover 11 adapted to snap-fit onto the neck portion to close the opening 5 in a fluid-tight manner. In the represented embodiment, the neck portion comprises an internal bead 12 which allows the clipping-on of the cover. The snap-on closure is attached to the bottle by a ring 13. A flexible part links the cover 11 to the ring 13. The flexible part 13 allows the cover 11 to flip between a closed position in which it seals the opening 5 and an open position in which the opening is free. In FIG. 2, the snap-on closure is in open position.

The use of a snap-on closure in the present invention is of interest because it does not require the neck portion to be provided with a thread. The neck portion must only have a sufficient height for attaching the ring 13. The height H of the neck portion 2 can be reduced to about 10 mm when such snap-on closure is used.

The parts forming the snap-on closure are made of a biodegradable plastic material, such a PHA.

Figure 3:
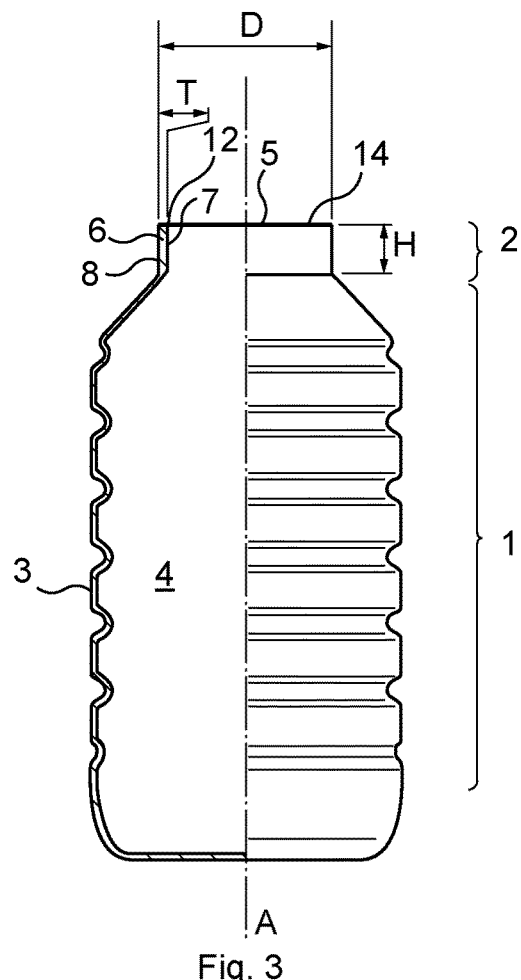
FIG. 3 represents a bottle according to a third example embodiment of the invention.

FIG. 3 represents a bottle according to a third example embodiment of the invention. In this embodiment, the body portion is similar to the body portion of the container of FIG. 1 and FIG. 2. More generally, the bottle of FIG. 3 corresponds to the bottles of FIG. 1 and FIG. 2 except for the neck portion 2 and its closure means. One can therefore refer to the description of FIG. 1, except for the elements recited hereafter.

The neck portion of the container of FIG. 3 is equipped with a closure lid 14. The closure lid 14 is a single-layer or multi-layer foil. It can be an aluminium foil, or it can be composed of biodegradable plastic and/or of coated paper.

The closure lid 14 can be heat-sealed, e.g. induction sealed, on the edges of the opening 5. To open the bottle, the cap is ripped off or torn, for example punctured, by the user.

The use of a sealed lid as container closure is of interest in the present invention because the neck portion 2 has only to be provided with an edge adapted for the sealing of the lid 14. The height H of the neck portion can thus be reduce to 10 mm or less, such as 8 mm.

The thickness T of the neck portion can also be reduced to about 1.6 mm, and even to about 1.2 mm when the neck portion has a large diameter, e.g. of more than 25 mm, such as between 25 mm and 35 mm.

Figure 4:
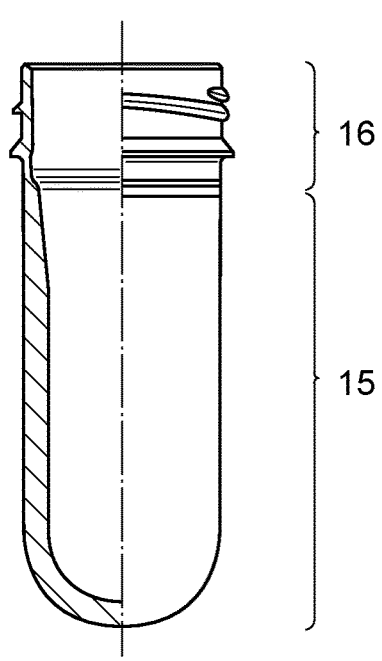
FIG. 4 represents a preform that can be used to produce a container according to an embodiment of the invention.

FIG. 4 represents a preform that can be used to produce a container according to an embodiment of the invention. This preform corresponds to the result of a first step of an injection stretch blow molding (ISBM) process that can be used to produce a container according to the invention.

In a step of injection of a preform S1, a preform is obtained by injecting PHA in an adapted injection mold. This comprises injecting molten PHA into the mold, cooling, and unmolding the preform.

In some embodiment of the invention, multi-injection can advantageously be used. More particularly, multi-injection can be used to provide a preform made of several materials, having different biodegradability performance.

In the represented embodiment, bi-injection is used to form a container having a body portion and a neck portion made of different materials. Such a distribution of materials is already present on the after-form and is found on the final bottle. In other word, the preform has a preform body portion 15 that will correspond to the body portion 1 of the container and a preform neck portion that will correspond to the neck portion of the container. The preform is thus bi-injected, so that it has a preform body portion 15 and a preform neck portion 16 made of different materials.

The preform body portion 15 corresponds to the part of the preform that will be highly deformed, i.e. inflated, during the subsequent blowing step of the process. The preform neck portion 16 is not deformed, or only slightly deformed, during the blowing step, but corresponds to the thickest part of the container.

Material properties sought for these respective portions can thus be different. While a material having mechanical properties making it adapted for blow-molding is sought for forming the body portion, a material having a high biodegradability but possibly poorer mechanical properties can be sought for the plastic material used for forming the neck portion.

In the bi-injection process used to form the preform, the preform body portion 15 is thus formed by injection of a PHA adapted for blow molding (see above), while the preform neck portion 16 is formed by injection of a highly biodegradable material.

For forming the preform neck portion, a PHA having high biodegradability properties can be used. An additive can be added to the material used for forming the neck portion. For example, the preform neck portion 16 can be made of a PHA material comprising cellulose as additive, e.g. up to 50% by weight of cellulose. Alternatively, cellulose based plastics or protein based plastics can be used.

The preform is heated to a temperature in the narrow vitreous transition range of the PHA used for the body portion.

A step of blow molding the preform is then performed.

The step of blow molding comprises injecting air at high pressure into the preform, which has been inserted into a mold. The mold has inner walls defining the shape of the final container.

In the represented embodiment, the preform has a circular cross-section. Other configurations can be used, that have a non-circular cross-section and/or ribs formed on the inner surface or the outer surface.

The preform neck portion 16 extends at an open first end 17 of the preform. The preform neck portion 16 has a tubular shape.

In this embodiment, the preform neck portion 16 is threaded. Other configurations of the preform neck portion are possible, depending on the closure means that are used on the container.

The preform body portion ends by a closed second end 18

The second end 18 of the preform has a substantially hemispherical shape. It can present a different shape, such as a substantially conical shape, in other embodiments.

The body portion 4 comprises a wall and has in the represented embodiment a tubular shape. The preform 1 has however a shape that is optimised for PHA stretch blow molding.

Other processes can be used in the present invention for forming a container. These processes include Extrusion Blow Molding (EBM) and its development called Compression Blow Molding (or Compression Blow Forming).

In extrusion blow molding, a continuous parison is axially extruded, clamped into a cavity and blown radially to form a container.

In compression blow molding, the extruded parison is molded in a compression mold cavity, forming a precise neck finish, and blown to form a container. Compression blow molding makes it possible to form a very thin walled neck portion.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A plastic container for a liquid, the plastic container comprising a body portion and a neck portion,
    the body portion comprising a body portion wall forming a reservoir adapted to contain the liquid,
    the neck portion being formed by a neck portion wall that forms an opening for filling the plastic container with the liquid and emptying the plastic container,
    wherein the container body portion wall and the container neck portion wall are made of biodegradable plastics, at least the body portion wall being made of a material comprising 40 to 99.9 weight percent of polyhydroxyalkanoate (PHA),
    wherein the neck portion is made of a PHA based material that is more biodegradable than a PHA based material of which the body portion is made, and
    wherein the maximum thickness of the neck portion wall is less than 2 mm.

2. The plastic container according to claim 1, wherein the neck portion is substantially cylindrical and has a diameter of more than 25 mm.

3. The plastic container according to claim 1, wherein the neck portion has a height of less than 15 mm.

4. The plastic container according to claim 1, wherein the neck portion comprises a thread, and wherein the plastic container comprises a threaded cap made of a biodegradable plastic material adapted to be screwed on the thread of the neck portion.

5. The plastic container according to claim 1, wherein the plastic container comprises a flipping cap adapted for snap-fitting onto the neck portion to close the opening.

6. The plastic container according to claim 1, wherein the plastic container comprises a closure lid sealed on the opening of the neck portion.

7. The plastic container according to claim 6, wherein the closure lid is substantially made of a material selected from the group consisting of aluminum, a biodegradable plastic material, and coated paper.

8. The plastic container according to claim 1, wherein the body portion and the neck portion are made of different materials.

9. The plastic container according to claim 1, wherein the PHA material of which the neck portion is made comprises an additive that enhances its biodegradability.

10. The plastic container according to claim 1, wherein the neck portion is made of cellulose-based plastics or of protein-based plastics.

11. The plastic container according to claim 1, wherein the PHA material of at least the body portion is a random monomeric repeating unit having of the formula:

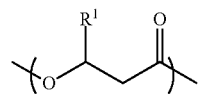

wherein $R^1$ is selected from the group consisting of CH3 and a C3 to C19 alkyl group.

* * * * *